Feb. 15, 1949.　　　O. F. FITCH　　　2,461,973
HAY STACKER DEVICE
Filed June 27, 1946　　　　　　　　　3 Sheets-Sheet 1
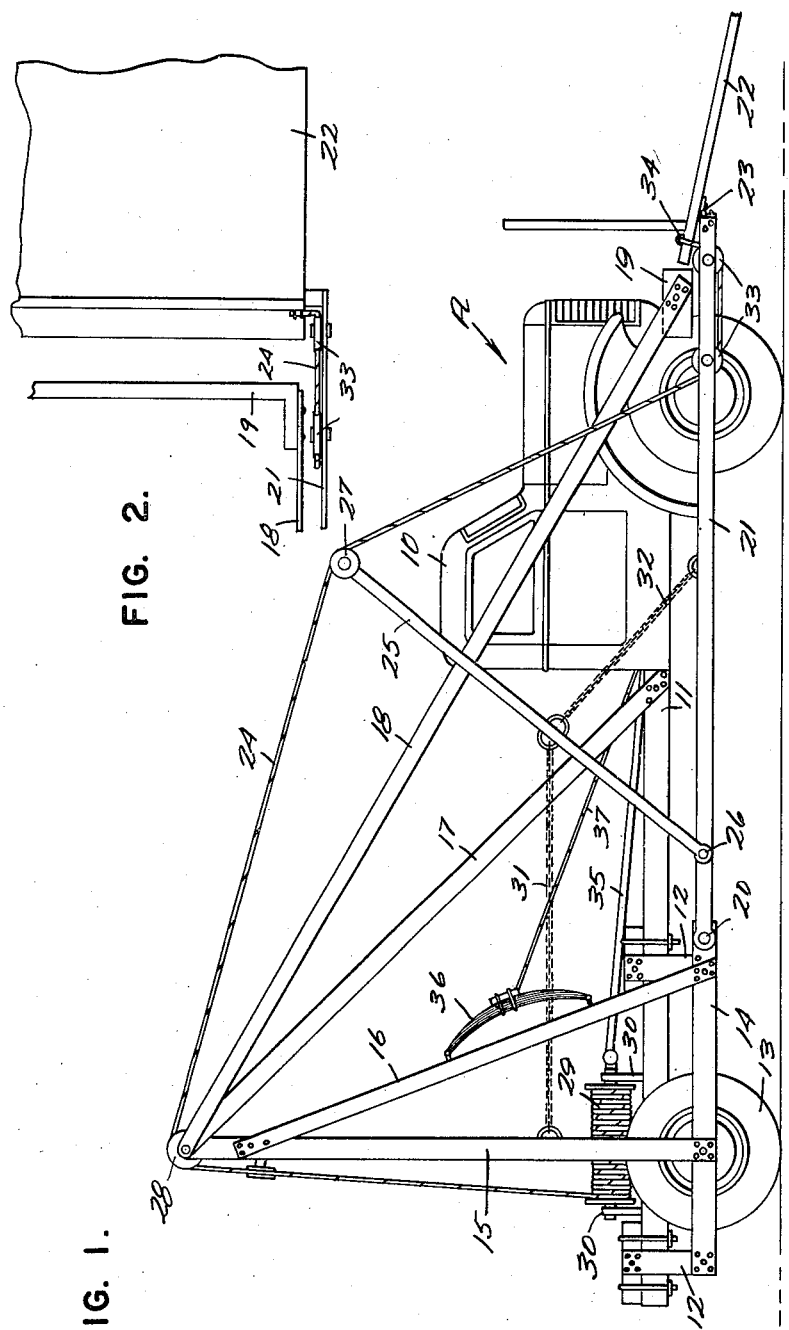
INVENTOR.
Oran F. Fitch,
BY Victor J. Evans & Co.
ATTORNEYS Feb. 15, 1949.   O. F. FITCH   2,461,973
HAY STACKER DEVICE Filed June 27, 1946   3 Sheets-Sheet 3

INVENTOR.
Oran F. Fitch
BY Victor J. Evans & Co.
ATTORNEYS

Patented Feb. 15, 1949

2,461,973

UNITED STATES PATENT OFFICE 2,461,973

HAY STACKER DEVICE

Oran F. Fitch, Alturas, Calif.

Application June 27, 1946, Serial No. 679,817

1 Claim. (Cl. 214—131)

The invention relates to a hay handling machine, and more especially to a hay stacker.

The primary object of the invention is the provision of a stacker of this character, wherein it is mountable and demountable on and from a vehicle of the motor type, such as a motor truck, and by power transmission therefrom the said stacker will operate for the stacking of hay in a field or other place of deposit, the stacker being of novel construction, and is unique in the assembly of its parts.

Another object of the invention is the provision of a stacker of this character, wherein it will handle hay, straw of other like materials, for the stacking thereof, and is susceptible of one man control, the motor vehicle equipped therewith being the power unit for the stacker.

A further object of the invention is the provision of a stacker of this character, wherein it is susceptible of carriage upon a motor vehicle, and in the mounting will not damage or mar such vehicle, and such stacker being conveyed thereby from one place to another under the power of such vehicle.

A still further object of the invention is the provision of a stacker of this character, which is simple in construction, thoroughly reliable and efficient in operation, strong, durable, readily and easily operated and controlled, possessed of few parts, compactly assembled and inexpensive to manufacture and install.

With these and other objects in view the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 1 is a side view of the stacker constructed in accordance with the invention.

Figure 2 is a fragmentary sectional view taken on the line 2—2 of Figure 1.

Similar reference characters indicate corresponding parts throughout the several views in the drawings.

Figure 3:
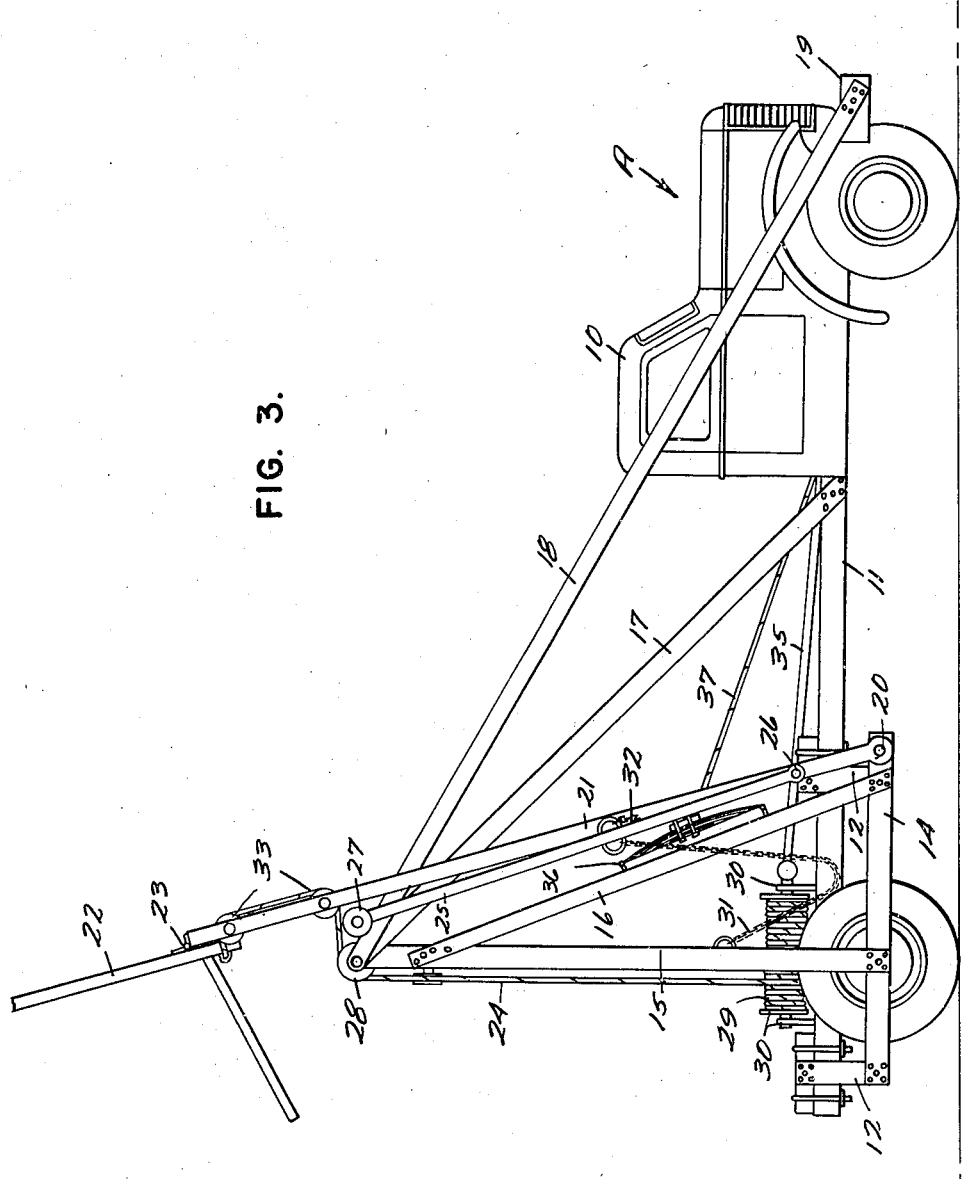
Figure 3 is a view similar to Figure 1 showing the stacker in a dumping or stacking position.
Figure 5:
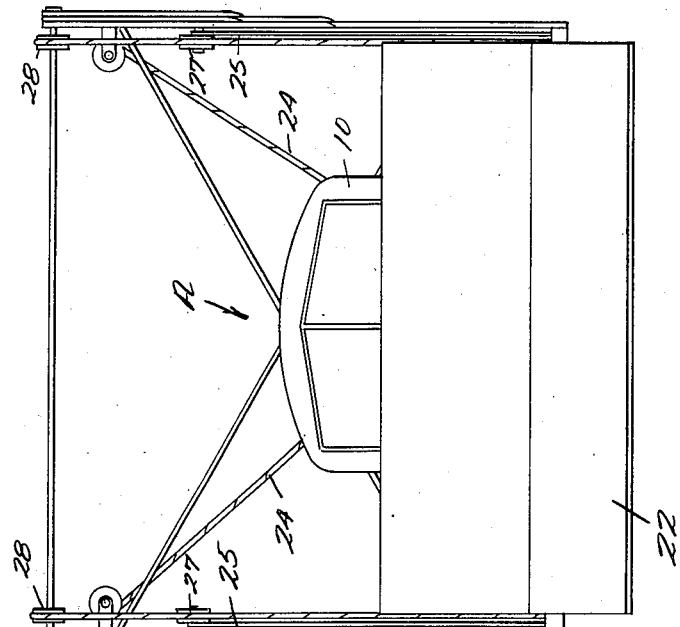
Figure 5 is a front elevation of the truck and stacker.
Figure 4:
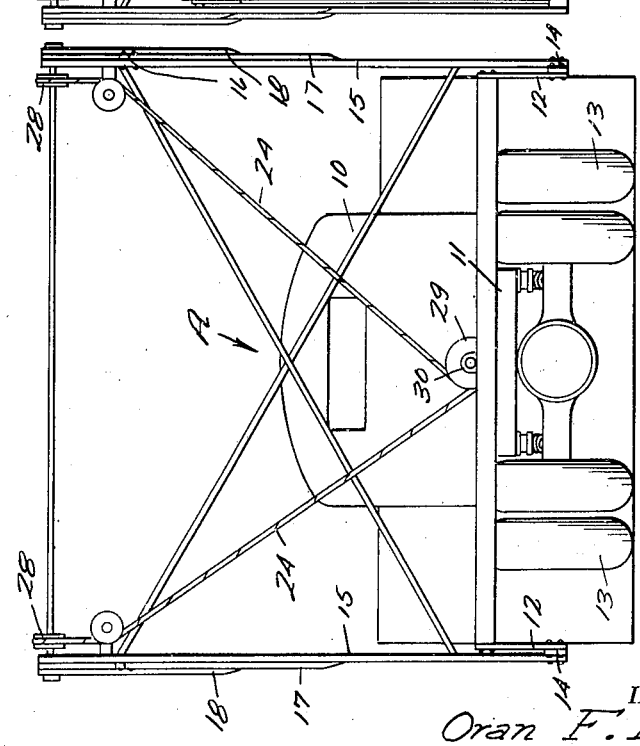
Figure 4 is a rear elevation of a truck with the stacker thereon.

Referring to the drawing in detail, A designates generally a motor truck of any standard type, particularly of the cab build, the cab being indicated at 10, while the chassis frame at 11 thereof. This truck A aft thereof has underslung by hangers 12 at each side of the same laterally beyond the rear traction wheels 13 therefor a horizontally disposed side supporting sill 14, from which rises a perpendicular upright or post 15, held rigid by a forwardly inclined brace 16, which is attached thereto and to such sill 14 at respective upper and lower ends. Supplementing the braces 16 are forwardly inclined intermediate and fore braces 17 and 18, respectively, which are also connected to the upright or post 15 and the side beam and front bumper of the chassis frame 11, the bumper 19 being of a special build, while the side beam is a part of the said chassis frame to be unitary therewith.

Connected by a pivot 20 to the sill 14 at the forward end of the same is one of a pair of sweep arms 21 for a tined rake head 22, which is hinged at 23 to the forward end of this pair of arms. The arms 21 swing upwardly rearwardly and forwardly in a vertical direction arcuately through the action of a hoisting cable 24, which is trained over a vertically swinging prop 25, connected at its lower end by a pivot 26 to the arm 21 next thereto, adjacent to its rear pivoted end, the upper end of the prop 25 being fitted with a guide pulley 27 over which travels the cable 24, and the latter is also trained or travels over a pulley 28 at the upper end of the upright or post 15 for lead to a winch or winding and unwinding drum 29, having support in a mounting 30 arranged on the truck chassis frame 11 aft thereof.

Each prop 25 is steadied by limit chains 31 and 32, respectively when angled to the vertical forwardly of the truck, the chain 31 being attached to the upright or post 15, while the chain 32 is attached to the sweep arm 21 next thereto, for folding and unfolding movements concurrently therewith in the stacking operation of the stacker. The cable 24 is under trained on spaced guide rollers or pulleys 33 mounted at the fore end of the arm 21 and has connection with the head 22 at the rear thereof, the point of connection being indicated at 34 of such cable.

The windlass, winch or drum 29 is powered from a drive shaft 35 operated by the motor, not shown of the truck A and on the brace 16 in the path of movement of the sweep arm 21 is a spring cushioning device 36, which cushions the said sweep arm when shifted upwardly in an arcuate direction for effecting stacking of the hay by the rake head 22, and also functions to initially lower the latter when relieved of its load, there being a release clutch control 37 coacting with this device and interposed between the shaft 35 and the transmission mechanism of the motor of the truck, the clutch and transmission mechanism being not shown and in this way the power to the cable is shut off when the sweep arm 21 has been completely lifted and the load of the rake head 22 discharged for stacking purposes.

What is claimed is:

A stacker for motor truck having a chassis frame, front and rear wheels, and motor, comprising vertically inclined hangers on the chassis frame fore and aft of said rear wheels, horizontally disposed sills connected to the lower ends of the hangers on both sides of said chassis frame, uprights vertically hung from the said sills on both sides of said chassis frame, angularly inclined braces secured to said chassis frame fore and aft of said motor and to the upper end of said uprights, a rake head fore of the truck and swingable on the forward ends of said sills for vertical arcuate movement to and from the uprights means powered by the motor for moving the rake head in an upward sweeping action toward the uprights, cushioning means in the path of upward sweep of the rake head and having connection with the power means to regulate the same for the downward sweep of the head after being completely relieved of a load, a sweep arm having the rake head hinged thereto, and a hoisting cable included with the power means and connected to the hinged rake head.

ORAN F. FITCH.

REFERENCES CITED

The following references are of record in the file of this patent:

UNITED STATES PATENTS

| Number | Name | Date |
|---|---|---|
| 853,797 | Johnston | May 14, 1907 |
| 1,435,879 | Sell | Nov. 14, 1922 |
| 1,791,979 | Sharp | Feb. 10, 1931 |
| 2,250,902 | Betzelberger | July 29, 1941 |
| 2,322,487 | Toftey | June 22, 1943 |
| 2,387,434 | Fitch | Oct. 23, 1945 |